P. PAPINI.
INDICATOR FOR ILLUSTRATING AND SIGNALING THE ROUTE OF A VEHICLE.
APPLICATION FILED MAR. 13, 1911.

1,112,086.

Patented Sept. 29, 1914.

4 SHEETS—SHEET 1.

Witnesses

Inventor
Pio Papini

P. PAPINI.
INDICATOR FOR ILLUSTRATING AND SIGNALING THE ROUTE OF A VEHICLE.
APPLICATION FILED MAR. 13, 1911.

1,112,086.

Patented Sept. 29, 1914.
4 SHEETS—SHEET 2.

P. PAPINI.
INDICATOR FOR ILLUSTRATING AND SIGNALING THE ROUTE OF A VEHICLE.
APPLICATION FILED MAR. 13, 1911.

1,112,086.

Patented Sept. 29, 1914.
4 SHEETS—SHEET 3.

Witnesses

Inventor
Pio Papini
by Connolly Bros.
Attys

P. PAPINI.
INDICATOR FOR ILLUSTRATING AND SIGNALING THE ROUTE OF A VEHICLE.
APPLICATION FILED MAR. 13, 1911.
1,112,086.
Patented Sept. 29, 1914.
4 SHEETS—SHEET 4.
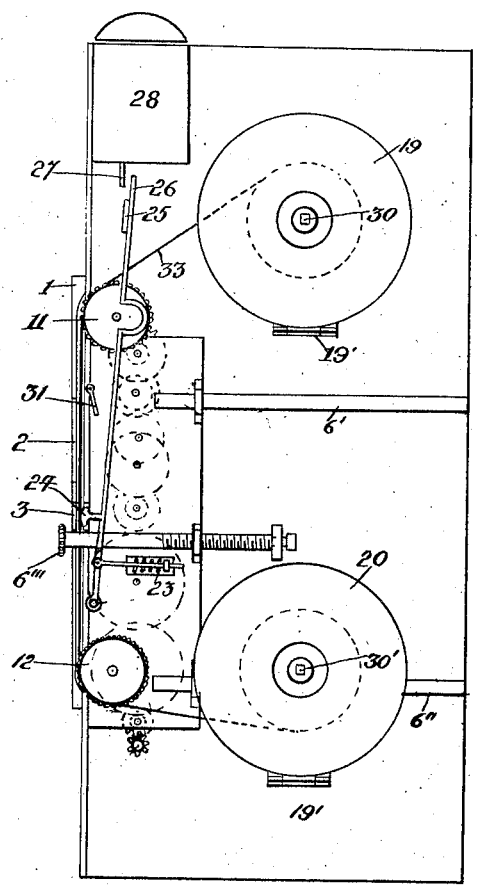

UNITED STATES PATENT OFFICE.

PIO PAPINI, OF FLORENCE, ITALY.

INDICATOR FOR ILLUSTRATING AND SIGNALING THE ROUTE OF A VEHICLE.

1,112,086.

Specification of Letters Patent. Patented Sept. 29, 1914.

Application filed March 13, 1911. Serial No. 614,228.

*To all whom it may concern:*

Be it known that I, PIO PAPINI, a subject of the King of Italy, and residing at 1 Piazza Signoria, Florence, Italy, have invented certain new and useful Improvements in Indicators for Illustrating and Signaling the Route of a Vehicle, of which the following is a specification, reference being had therein to the accompanying drawing.

The present invention refers to a device by which the occupants of a vehicle may be informed of and made acquainted with the interesting particulars of the route along which they are traveling. This is obtained in the following manner: The noteworthy points are marked on a band which unwinds with a motion synchronous with that of the vehicle, and, at their approach, actuates suitable signals. By the same device the driver of the vehicle may be advised beforehand of steep ascents and descents, sharp turnings, level crossings, etc., or which way to take when coming to a cross-road, and of any other particulars of which warning might be useful.

The present invention may be carried into effect in many different ways, but only one form of construction is shown in the accompanying drawings, in which:—

Figure 1:
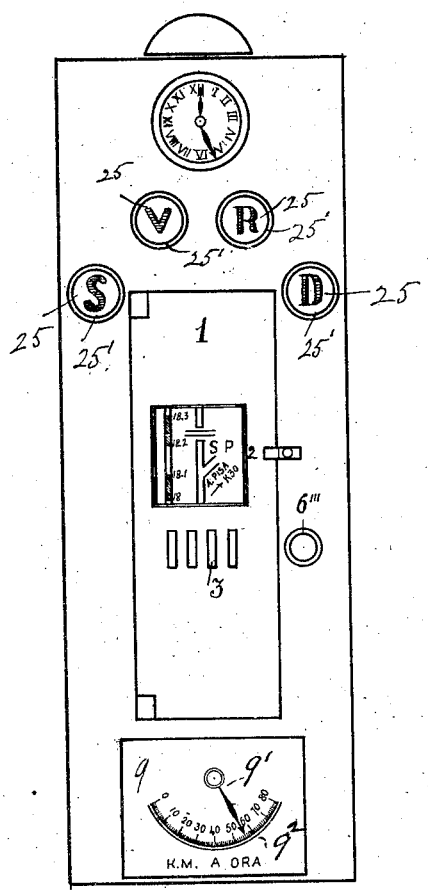
Figure 2:
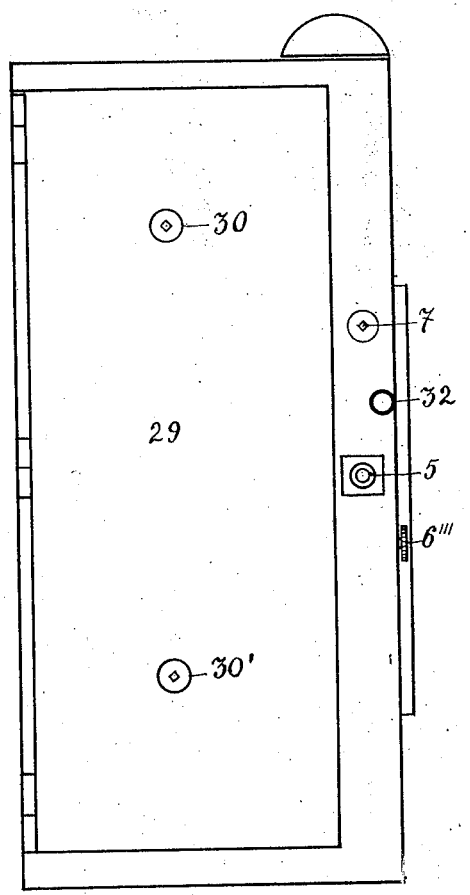
Figure 3:
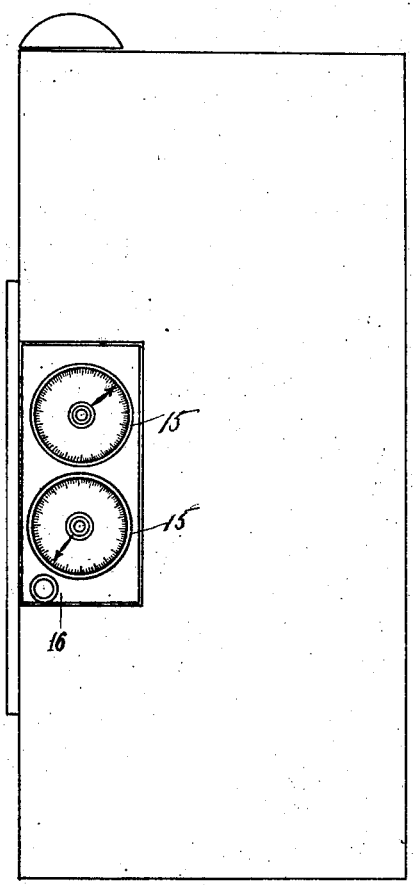
Figure 4:
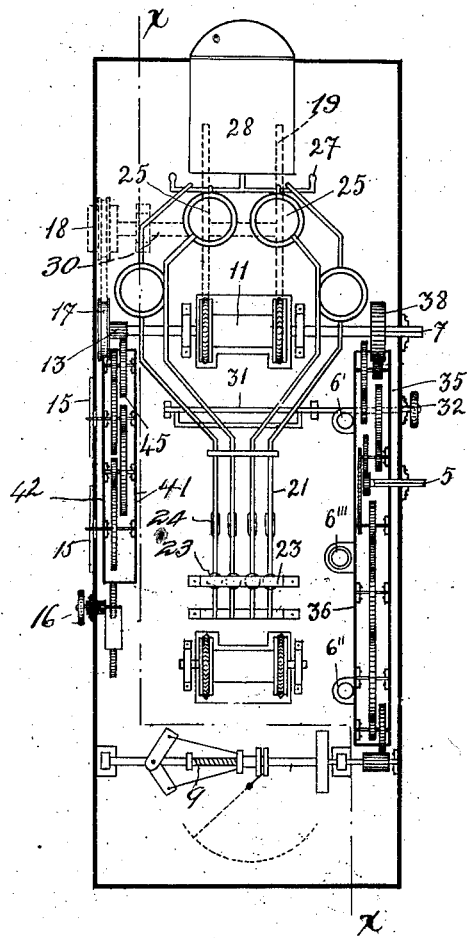
Figure 5:
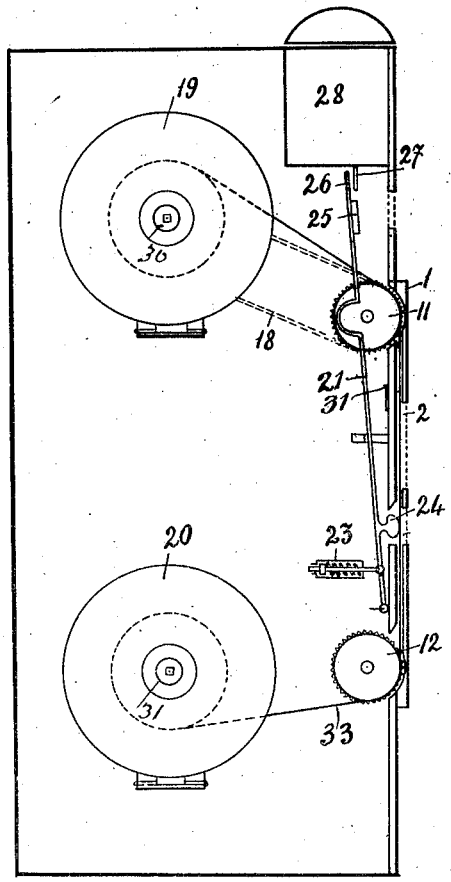
Figure 6:
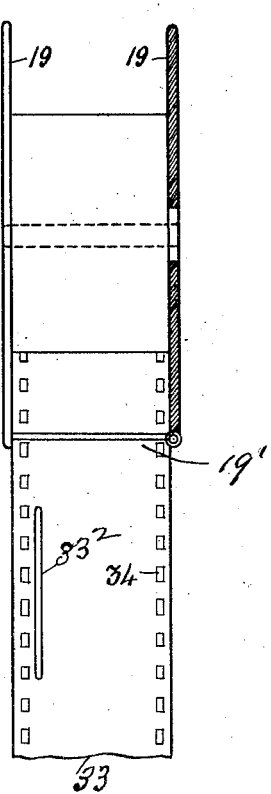

Figure 1 is a front elevation of the apparatus. Figs. 2 and 3 are side views of the same seen from the right and left sides respectively. Fig. 4 is a view of the interior, back of the front plate, the spool 19 being shown in dotted lines. Fig. 5 is a cross section. Fig. 6 is a detail drawing of the band, 33 and spool 19. Fig. 7 is a section on the line *x—x* of Fig. 4, looking toward the right.

In the form of construction shown in these drawings the above mentioned purposes are obtained by causing a band—33, which may be of the nature of a kinematograph film or made of celluloid, paper, linen, metal or any other suitable material, to unwind in a convenient way, as, for example, from the spool 20 on to another 19, the speed of this band being at all times proportional in a suitably reduced ratio to that of the vehicle. These bands 33, one form of construction of which is shown in Fig. 6, serve two purposes which are obtained by purely mechanical means, without the use of any electrical device whatever. Electrical mechanism is very apt to get out of order especially if worked in the open air where it may be affected by dust, dirt or lubricating oil. To achieve the first of these purposes, all the particulars of the route are reproduced on these bands by convenient means, so that, upon the bands unwinding in conformity with the progression of the vehicle, these particulars will come in sight and be displayed. For the second purpose, the bands are provided with holes $33^2$, the edges of which come into contact, according to the particulars of the route to which attention is to be drawn, with some suitable signal operating device. This arrangement consists of small rods 21, pivoted at one end, and the knobs 24, which actuate them. When a knob, over which the band slides, encounters a hole, the corresponding rod is displaced by a spring 23. These devices actuate mechanically one or more optical, acoustic or other suitable signals to draw the attention of the occupants of the vehicle, beforehand, to the different particulars of the route. If different signals are used according as for example a bridge, a monument etc., is to be announced, the nature of the approaching point will be made known. The knobs 24 are rounded on their upper surfaces, and barely enter the slots in the band, so as not to interfere with the movement of the latter, which rides over the knobs.

One part of the band may be used for advertisements etc., which may be in relation with and make use of the particulars of the road for which the band is designed so as to call attention to hotels, to workshops, garages etc., at the moment the car passes them.

The band unwinds behind a frame 1, which keeps it evenly pressed against the front wall of the case containing the apparatus, and behind a window 2.

If the apparatus is to announce only those particulars of the road which it might be useful for the driver of the vehicle to be warned of, the band would contain only the arrangements to actuate those signals. It would thus serve to advise the driver of steep ascents or descents, of sharp turnings, of level crossings etc., and to indicate to him which direction to take when coming to cross-roads, different signals telling him to turn to the right or left respectively, while no signal, in this case, would mean to go straight ahead. Thus, in practice, the signals which ought to be marked on the band so as to be actuated before coming to the various obstacles are "slow down", "to the right" and "to the left".

The band 33, is provided at its edge with holes 34 in which work two sets of teeth on the rims of an adequate number of rollers and with elongated holes $33^2$ of different lengths for the passage of a knob 24. In the form of execution shown in the drawings (Figs. 4 and 5) the apparatus is provided with two such rollers 11 and 12, of which one (in the drawing 11) is the driving wheel rotating with a speed proportional to that of the wheels or of the propelling system of the vehicle. The other roller merely guides the band.

It is necessary that the spool, which receives the band, should at all times rotate with a peripheral speed identical with that of the driving roller 11. Since, however, the periphery of the spool, 19, increases upon the bands winding on to it, it is not possible to use a rigid transmission, such as by means of toothed wheels. The play which must be allowed in the transmission can best be obtained by using a belt. In the example shown a pulley, 17, keyed to the spindle of the driving wheel, 11, transmits its motion to a pulley, 18, keyed to the spindle of the receiving spool, by means of a belt which should be loose enough to transmit only such force as is necessary to keep the band tight. Any other suitable non-rigid transmission, however, may serve this purpose, and it would also be possible to use the driving roller itself as the receiving spool. Motion is imparted to this roller through speed reducing gear consisting of toothed wheels, as in the case shown, or of a belt or of any other suitable device. Its motion may be obtained from the wheels or from the propelling system of the vehicle, the connection being obtained through a flexible shaft 5, as in the present example, or by any other suitable means. The transmitted motion must be kept unaltered in direction and its speed reduced in a uniform proportion.

The band must, from the beginning, anticipate by a certain distance the particulars it illustrates and announces, and for the following two reasons, it is necessary that a suitable device should be provided to allow of this advance being regulated. Since the conditions, under which a vehicle travels, vary the amount of the advance ought to be variable. In a fog, for instance, or when the vehicle is going at a great speed the obstacles will have to be announced earlier than on a fine day or when the vehicle is driven at a moderate speed. And while the length of the band is fixed and always proportional to the length of the road, the number of revolutions of the wheels necessary for a vehicle to cover a certain distance is not constant. It is impossible that the vehicle should always follow the center line of the road, deviations being unavoidable. Besides, the wheels may skid, and with pneumatic tires the diameter varies according to the degree of inflation. The band will, therefore, as a rule increase the advance in regard to the particulars, and for this reason a device must be provided to bring the band back to the desired point whenever this is necessary. To obtain this object, the band must be brought back to the desired point after having disengaged the mechanism, for the moving of the band, from the parts from which it derives its motion and also from those other parts which, as will be hereafter explained, may derive their motion from this mechanism. This disconnecting device is constructed and works in the following way: The toothed wheels are mounted in a frame consisting of two parallel walls, 35 and 36, which are connected at their ends. This frame is provided with two holes for the cylindrical guides 6' and 6" while a third hole receives a screw ending in a button 6''' which projects from the case containing the apparatus. If this screw is turned by means of its button, the frame slides on the guides 6' and 6". The bow-piece 31, can be turned by means of the button 32, which is keyed to its axle and which projects outside the case, until its plane is normal to the wall of the case on which it is pivoted. It thus depresses the levers 21, and prevents them from pressing against the band, and their knobs from engaging with the holes. The driving roller, 11, and the receiving spool, 19, are now quite free. The roller, 11, may be turned by means of a suitable crank fixed on its axle, 7, which projects outside the case and the band 33, may be wound on to the spool.

If a great part of the band has to be unwound, for instance, in order to examine it, it is sufficient to turn, by means of suitable keys, the rollers, 19 and 20 whose axles project from the case in 30 and 30'.

Some provision must be made for the easy removal of the bands from the receiving spool, in order to change them. This is obtained in the following way: The band is wound on to one of the spools and access to the spool, 19, is obtained by opening the door, 29, on the right hand side of the case. The ends of this spool consist of two disks pierced by the axle and connected by a cross piece 19' (Fig. 6) on which the disk near the outside of the apparatus is pivoted. This disk need only be turned about its pivot in order to extract the rolled up band and replace it by another. The disks on spools 19 and 20 are loosely mounted, so that the spools can turn without turning the disks.

It will be seen that this apparatus may be used as a guide for the drivers of vehicles on roads unknown to them. Thus it will not be necessary to stop the vehicle or slow down in order to consult the map or ask for information, etc.

In the form of execution shown in the drawing, four signals are used in addition to a bell which rings each time attention is to be drawn to some particular of the road. But, if desired, more signs and of different types, may be used. The signs for the driver are in this case: "to the right" "to the left" and "slow down" and the one for the occupants of the car "noticeable particulars of the road" indicated respectively by the letters D, S, R, and V. These signs consist of four disks 25 of different color, each of them carried by one of the four levers 21, which are pivoted in 22. When a hole $33^2$ in the band passes before a knob 24 of one of these levers, the latter, acted on by its springs 23, rotates and the disk 25 appears through a suitable hole 25' in the front of the casing containing the apparatus.

Suitable counter-holes 3, provided opposite the knobs 24, in the wall of the casing and in the frame placed on it, permit these knobs to pass through the holes in the band. During this motion the end 26 of the lever comes into contact with and moves the small rod, 27, causing a bell, 28, to ring and announce the appearance of a signal.

15, 15 represent the graduated dials of a cyclometer, the indexes of which are operated from a suitable train of speed reducing gearing, receiving motion from shaft 7. This train, which is supported in an adjustable frame composed of parallel walls 41, 42, connected at the base, is adjusted by means of a button 16 projecting through the frame of the apparatus.

9 designates a tachometer, with which the apparatus may be equipped, and which receives motion from a suitable moving part. 9' is the indicating scale and $9^2$ the traveling index of the tachometer.

By combining two or three signals it is possible to give, with a limited number of signals, additional information.

I claim:—

1. In a route indicator for vehicles, two spools adapted to travel in synchronism with the motion of the vehicle, a route signaling band traveling between the two spools and provided with holes, mechanism for conveying motion to the band from the wheels of the vehicle, a plurality of pivotally arranged levers, knobs on said levers adapted to enter the said holes without obstructing the movement of the band, springs to keep the knobs in contact with the said band and signals actuated by the said levers, means for disconnecting the band moving mechanism from the parts from which it derives its motion, and means for simultaneously displacing all said levers from operative relation to the band, said means consisting of a pivoted bow piece arranged transversely to said levers.

2. In a route indicator for vehicles, two spools adapted to travel in synchronism with the motion of the vehicle, means for imparting motion to said spools in unison with the motion of the vehicle, a route signaling band traveling between the two spools and provided with holes, a case having a front wall provided with holes, a frame before the front wall, provided with holes and forming with the said wall a slit for guiding and flattening the band, a window in the said frame to make the band visible, pivotally arranged levers to slide along the said band, knobs on the said levers adapted to enter the holes in the band, the front wall and the frame, and signals actuated by the said levers.

In witness whereof I, said Pio Papini, have signed this specification at Florence in the Kingdom of Italy this 20th day of February 1911.

PIO PAPINI. [L. S.]

In the presence of two witnesses:
BOVINSEGNI RAFFAELLO JESTIMONE,
CHARLES L. BOLOQUERI JESTIMONE.